Jan. 23, 1940.  A. T. GREGORY  2,187,737
VARIABLE SPEED SUPERCHARGER DRIVE
Filed Sept. 11, 1936  2 Sheets-Sheet 1
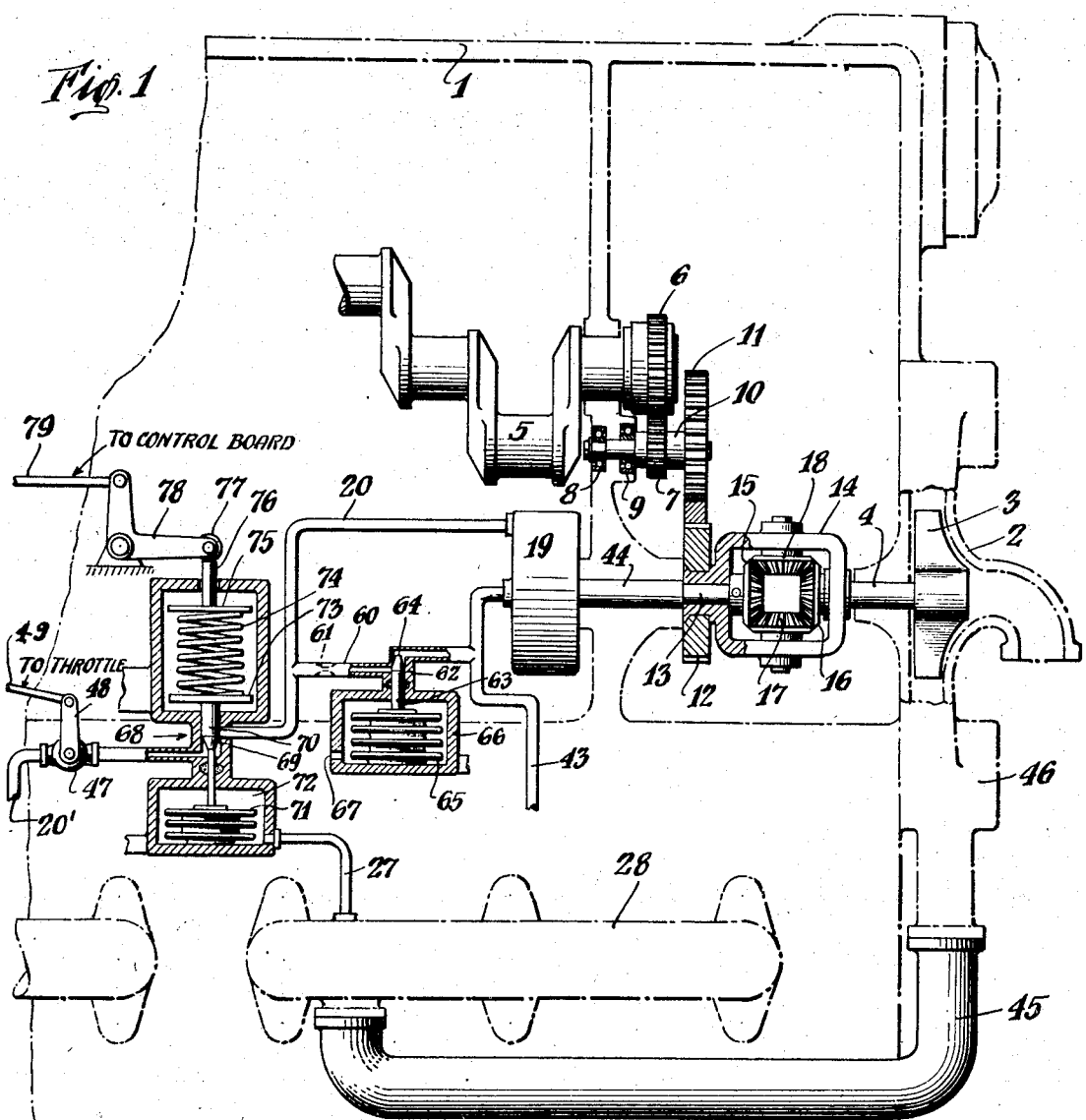
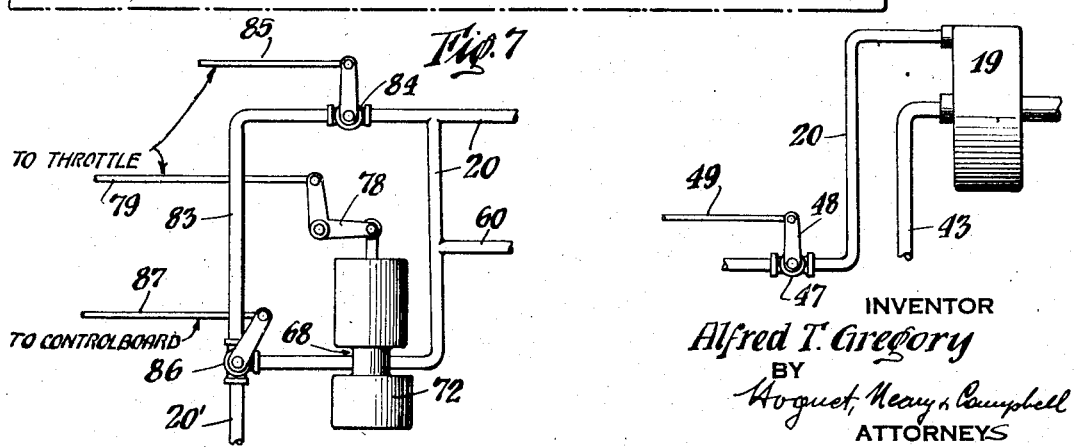
INVENTOR
*Alfred T. Gregory*
BY
*Huguet, Neary & Campbell*
ATTORNEYS

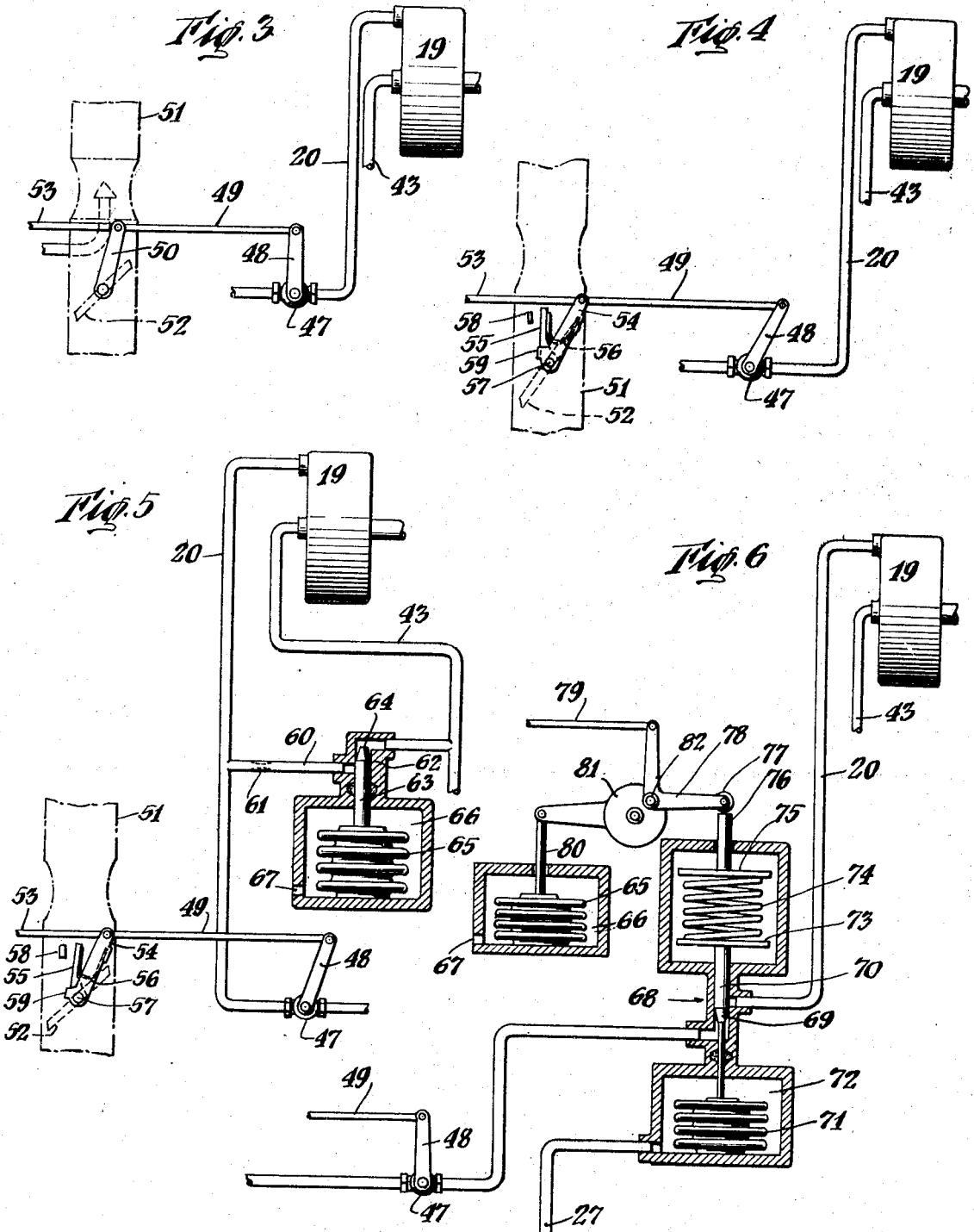

UNITED STATES PATENT OFFICE 2,187,737

VARIABLE SPEED SUPERCHARGER DRIVE

Alfred T. Gregory, Farmingdale, N. Y., assignor to Ranger Engineering Corporation, Farmingdale, N. Y., a corporation of Delaware Application September 11, 1936, Serial No. 100,307

16 Claims. (Cl. 123—119)

This invention relates to means of driving and controlling a supercharger for internal combustion engines.

In contradistinction to the conventional manner of control of the engine manifold pressure by means of the carburetor throttle, or other engine throttling means, I propose to provide a flexible means for operating the supercharger impeller at infinitely variable speeds, within a certain range, independently of the throttling of the engine or of the engine speed, so as to obtain any required manifold pressure. The advantages of such an arrangement are particularly apparent in aeronautical engines. For instance, it would permit the operation of the engine at full throttle at all times, at different altitudes including sea level, and even for cruising. This makes for a considerable gain in engine power and economy since losses through the carburetor and therefore the work of supercharging are reduced to a minimum, thereby keeping the volumetric efficiency high and lowering the manifold pressure required for a given power output. The take-off and emergency ratings of the engine can thus be considerably increased and the specific fuel consumption reduced.

To this end I propose to provide means for regulating the manifold pressure, either manually, or automatically by means of an automatic manifold pressure regulating valve, to any desired pressure at any altitude up to the critical altitude for that pressure, simply by controlling the speed of the supercharger impeller independently of the crankshaft speed. I further propose to provide an independent control valve, which, when set, is automatically operated by the pressure of the atmosphere for automatically varying the speed of the impeller to maintain the manifold pressure constant at the desired value during any change in altitude within the range up to the critical altitude for the particular manifold pressure. Above the critical altitude, the impeller is driven at its maximum speed, depending on the engine speed and on the gear train between the engine and the impeller. This arrangement, since it may be automatic in operation, has the advantage of relieving the pilot of the necessity of constantly watching the manifold pressure.

The invention is described in greater particularity in the following description and appended claims and in the accompanying drawings, in which:

Figure 1 generally represents a fragmentary side view of an engine, partly schematic and partly in section to show the relationship between the manifold, supercharger, crank shaft, the differential between the engine drive and the supercharger impeller, the throttle and manifold pressure control, and the fluid brake for a shaft of one of the differential gears;

Figure 2 is a diagrammatic partial showing of a modified form of supercharger speed control, involving the use of a single manually operated valve in the liquid supply line;

Figure 3 is a diagrammatic partial showing of a modified form of supercharger speed control involving the use of a single control member attached to the carburetor throttle control lever;

Figure 4 is a diagrammatic partial showing of a modification of the form of the invention shown in Figure 3;

Figure 5 is a diagrammatic partial showing of a manual form of supercharger speed control with an automatic altitude compensating arrangement;

Figure 6 is a diagrammatic partial showing of a modified form similar to that shown in Figure 1 except that the by-pass line for altitude control is replaced by an altitude control incorporated in the manifold pressure regulating device; and Figure 7 is a diagrammatic partial showing of an alternative automatic or manual control for the supercharger drive.

Referring more particularly to the drawings, in Figure 1 the engine is generally indicated at 1 with a supercharger 2 having an impeller 3 mounted on a shaft 4 suitably journalled on the engine casing. The engine manifold 28 is connected to the scroll 46 by a pipe 45. The drive for the impeller 3 is taken off of the crank shaft 5 through any suitable train of gears. For example, the gear 6 is carried by the crank shaft and meshes with a small gear 7 carried by a shaft 10 having bearings 8 and 9 on the casing and also carrying the large gear 11.

The differential 14 includes a bevel gear 16 fixed to the impeller shaft 4 and a bevel gear 15 fixed to a shaft 13. Two intermediate idler bevel gears 17 and 18 are carried by the differential housing and mesh with gears 15 and 16. The differential housing is journalled on shafts 4 and 13 and carries a gear 12 meshing with the engine driven gear 11 which rotates the differential.

The shaft 13 is fixed to a shaft 44 which is the rotary shaft of a suitable hydraulic brake, the housing of which is shown at 19. The fluid for this brake may be oil under pressure supplied through pipes 20' and 20 from the engine lubricating system. The pipe 43 is a suitable drain from the brake to an oil scavenging pump. Obviously the fluid may be other than oil and may be supplied by a separate pressure means.

Figure 1 shows an arrangement embodying a control valve, an automatic altitude compensator and an automatic pressure regulating arrangement. In the line 20 there are located two suitable valves 47 and 68. The oil is preferably fed to the brake 19 under pressure through valve 47 and a metering valve 68 directly from the delivery side of the oil pump of the engine. The control valve 47 has an operating lever 48 pivotally connected to a control rod 49, so as to be mechanically operated by means of a suitable connection with the carburetor throttle. The connection with the throttle is so arranged that the valve 47 is not opened until the throttle reaches the fully opened position. While some manual regulation is accomplished by valve 47 after the full throttle position has been reached, its primary function is to shut off the supercharger entirely until the throttle is fully open. Additional movement of the rod 49 then opens valve 47 until in its full open position it offers no restriction whatever to the flow of oil through the line 20 and the control of the rate of flow is accomplished by means of the metering valve 68.

Valve stem 70 of pressure regulating valve 68 has a tapered portion 69, the position of which governs the area of opening in the valve and thus regulates the rate of flow of the liquid into the line 20. One end of the valve stem 70 is attached to a sealed bellows 71. These bellows are contained in the engine frame. The bellows are contained in a chamber 72 which is connected through a pipe 27 to the intake manifold 28. Variations in the pressure in manifold 28 cause the bellows to expand or contract and thus open or close valve 68. On the upper end of valve stem 70 is a disc 73 holding a spring 74. The other end of the spring is held by a disc 75 on the rod 76. A bell-crank 78 carries a roller 77 resting on the end of the rod 76. This bell-crank is actuated by the rod 79 from the control board.

If during the operation of the engine, it is desired to raise the manifold pressure, the control rod 79 is drawn to the left, turning the bell-crank 78 counter-clockwise and raising the roller 77. The force of the spring 74 then raises the disc 75 and rod 76 against the roller 77. This action, however, decreases the spring load on the disc 73. The valve stem 70, therefore, is displaced upward by the force of the bellows 71, which react against both the pressure in the chamber 72 and the force of the spring 74. Valve 68 is thus opened further, permitting a greater flow of liquid to the brake with consequent speeding up of the supercharger and raising of the manifold pressure. The increase in manifold pressure causes an increase in the pressure in 72 and consequent contraction of the bellows 71. Valve 68 is thus partly closed by the bellows until the valve stem is in a predetermined position in which just the correct amount of liquid is allowed to pass through the valve to maintain the desired manifold pressure. This pressure regulating device can be calibrated, the position of the control on the control-board then indicating on a scale the pressure which is obtained in the manifold when the control is in that position.

This adjustment is predetermined in accordance with the resulting desired manifold pressure. This adjustment, in other words, permitted the expansion of the bellows and the consequent rise of the disc 75. The effect of this is to actuate the metering valve 68 into open position sufficiently to allow some oil or more oil to flow into the brake 19. This flow results in the application of the required load on the hydraulic brake and its shaft 44. The shaft 13 is thereby slowed down while the impeller shaft 4 is speeded up, thus providing for the desired manifold pressure. If during operation the manifold pressure should vary, due say to a change in the boost pressure at the entrance to the carburetor, the pressure within the chamber 72 would likewise be either raised or lowered, thus automatically closing or opening valve 68. The impeller would thereby be slowed down or speeded up accordingly, so as to bring the manifold pressure back to the original pressure. So long as the setting of the control member 79 remains the same, the arrangement thus maintains a constant manifold pressure under varying operating conditions including varying carburetor entrance air pressure, engine speed, and oil viscosity.

When the engine is started, both valves 47 and 68 are closed. There is consequently no load on the hydraulic brake. The gear 11 is driven by the crank shaft 5 and drives the gear 12 and the differential 14. Shafts 4 and 13, carrying gears 16 and 15, respectively, consequently rotate with the differential. As soon as shaft 4 and the impeller 3, fixed thereto, start to rotate, however, a load is imposed on gear 16 by the impeller 3, retarding its speed of rotation. Since there is no load on gear 15, the idler gears 17 and 18 are caused to rotate and drive gear 15 at a relatively greater speed. During all operation of the engine at less than full throttle, therefore, the impeller rotates relatively slowly and the shaft 13 relatively rapidly, or in other words nearly twice as fast as gear 12. All operation of the engine at less than full throttle is thus done without material aid from the supercharger.

In Figure 1, a by-pass line 60 connects the supply line 20 with the outlet line 43. In the bypass line 60, a valve 62 regulates the rate of flow of the liquid through the by-pass line. The valve stem 63 is tapered on the end 64. The area of opening of the valve is thus regulated by the position of the stem 63, which is secured to the top of a sealed bellows 65. The other end of the bellows is secured to the engine frame. These bellows are contained in a chamber 66 which is open to the atmosphere through 67.

At sea level a pressure of approximately 15 lbs./sq. in. acts on the bellows 65 and holds the valve 62 in the full open position. The rate of flow of liquid through the by-pass line is then controlled by the jet 61. If valve 68 is only slightly open, most of the liquid flows through the by-pass line and very little reaches the brake. It requires a considerable opening of valve 68, therefore, to obtain a small load on the brake.

As the atmospheric pressure decreases, for instance during a climb, the pressure on the bellows 65 decreases. These bellows, therefore, expand and partly close valve 62. Consequently, less liquid flows through the by-pass line and more through the brake. The effect, therefore, is to speed up the supercharger and thus prevent a drop in manifold pressure. By suitable design of the taper 64 the drop in atmospheric pressure can be accurately compensated for and the manifold pressure thus held constant during a climb.

Thus, once the control 79 has been set to obtain a desired manifold pressure at sea level, the altitude compensating arrangement automatically maintains that manifold pressure constant during any change in altitude up to the critical altitude for that pressure without requiring any attention on the part of the pilot. When the critical altitude is reached, valve 62 is closed tight and all the liquid passing valve 68 enters the brake 19. The full load is thus applied to the brake, and the supercharger, therefore, turns at its maximum speed, which is nearly twice the speed of gear 12.

It is, therefore, unnecessary to operate the throttle or to disturb the setting of control member 79 during a climb. A separate setting of the control member 79 is required, however, to obtain the take-off or emergency manifold pressure, or to change from take-off or emergency manifold pressure to rated or cruising pressure as desired.

Figure 2 shows a simple method of manual control for the supercharger speed and, therefore, the manifold pressure. This method consists of a single valve 47 in the liquid supply line 20. The brake is shown at 19, while 43 is the drain line from the brake. Valve 47 is actuated separately and independently through the lever 48 and the control rod 49 which connects valve 47 with the control board. The supercharger speed is regulated entirely manually with this arrangement and depends only on the position of the lever 48 and valve 47. A high manifold pressure may, therefore, be obtained under any desired operating conditions, whether at part throttle or full throttle at any engine speed and at any altitude.

Figure 3 shows a modification of the single control arrangement of Figure 2, in which the control rod 49 is attached to the carburetor throttle lever 50. The throttle control rod 53 extends to the control board. The carburetor is represented at 51, while 52 is the throttle. Moving the throttle, therefore, results in simultaneously actuating the supercharger. By suitable connections between the throttle and valve 47 the supercharger speed is restricted at small throttle openings. The arrangement of Fig. 3 is such that the supercharger speed and therefore the manifold pressure can be varied at will during approximately the last 10° of throttle motion up to full throttle. This means of control would make it impossible to operate the engine at low power with a high manifold pressure. It has the further advantage of regulating both the throttle and supercharger with a single control.

Figure 4 shows a further modification of the single control arrangement in which the control rod 49 is attached to a lever 54, pivoted on the throttle shaft 57. A spring 56 keeps lever 54 and throttle control lever 55 apart. The stop 59 on lever 54 retains the throttle control lever 55 and thus governs the maximum angle between the two levers. As lever 54 is drawn to the left by control rod 53, lever 55 is also turned toward the left under the force of the spring 56 until lever 55 touches the stop 58 at which time the throttle 52 is in the full open position. As lever 54 is turned further it compresses the spring 56. Lever 48 is so arranged that valve 47 does not start to open until the throttle 52 is in the full open position. In this way, all part throttle operation is done without the aid of the supercharger. Regulation of both throttle position and supercharger speed is accomplished by means of a single control.

Figure 5 shows a combination of the type control shown in Fig. 4, with the automatic altitude compensating arrangement shown in Fig. 1. With this arrangement, the pilot sets his manifold pressure by means of the valve 47. The altitude compensating arrangement automatically compensates for changes in the atmospheric pressure with changes in altitude. This altitude compensating arrangement may also be applied with equal facility to the types of control shown in Figs. 2 and 3.

Figure 6 shows an arrangement similar to that in Figure 1 except that the by-pass line for altitude control is eliminated and in its place is an altitude control incorporated in the manifold pressure regulating device. Atmospheric pressure is admitted to the chamber 66 through passage 67. The bellows 65 expand or contract according to the atmospheric pressure. Expansion of bellows 65 due to a lowering of the atmospheric pressure results in an upward motion of rod 80 and clockwise rotation of shaft 81. Bell-crank 78 is pivoted eccentrically at 82 to the shaft 81. Consequently clockwise rotation of shaft 81 causes counter-clockwise rotation of bell-crank 78 and therefore raising of roller 77. Rod 76 and plate 75 are thereby raised, thus reducing the tension in the spring 74. The force on the plate 73 and rod 70 is thereby reduced. Bellows 71 therefore expand, raising rod 70 and opening valve 68. More liquid is thus admitted to the brake 19, causing speeding up of the impeller. A drop in manifold pressure as a result of the decreased atmospheric pressure is thus prevented.

In both the arrangements of Figs. 1 and 6, rod 79 may be connected directly to the throttle lever for operation only at full throttle, so that during all part throttle operation, valve 68 remains closed. Continued movement of the throttle lever in the same direction after the full throttle position has been reached, accordingly actuated control rod 79 and turns bell-crank 78 in a counter-clockwise direction to relieve the pressure on the spring 74 and permit the valve 68 to open. Stops may be provided on the throttle control lever to lock it in position to give any desired predetermined manifold pressure. With this arrangement, the control valve 47 may be omitted, thus providing a single control.

Fig. 7 illustrates an arrangement whereby manual control may be substituted in the event of failure of the automatic control for any reason. In this arrangement a by-pass 83 between the pipe 20 and the fluid pressure supply 20' is provided around the automatic control mechanism and is fitted with a manual control valve 84. The operating rod 85 for manual control valve 84 and the operating rod 79 for the automatic control are both connected to the throttle lever for simultaneous operation after full opening of the throttle. A three-way valve 86 controlling the flow of the pressure fluid either directly to the pipe 20 or to by-pass 83 and thence to line 20, is connected by operating rod 87 to a separate control on the dash in the cockpit. In the normal position of the valve 86 by-pass 83 is closed and the pipe 20 open for operation of the automatic control. If for any reason it is desired to by-pass the automatic control, valve 86 is manipulated by means of control rod 87 to close pipe 20 and open the by-pass 83, so that regulation of the manifold pressure would be accomplished by means of manual control valve 84, during operation of the throttle control in the manner described.

I claim:

1. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, and a plurality of valves in said pipe for jointly controlling the retarding action of said brake to cause said drive to vary the speed of said impeller.

2. In combination with an internal combustion engine, a supercharger connected to the intake thereof and having an impeller, a flexible and infinitely variable speed drive, within limits, between said engine and the impeller of the supercharger, a fluid brake for controlling the speed of said drive and means responsive to the change in atmospheric pressure resulting from variations in altitude of the engine for varying the fluid in said brake to compensate for the effect of such altitude variations on the engine intake manifold pressure.

3. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, and means responsive to the changes in atmospheric pressure resulting from variations in the altitude of the engine for controlling said valve.

4. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, and means responsive to the change of atmospheric pressure resulting from an elevation of the engine to a predetermined altitude for actuating said valve, whereby the retarding influence of said brake on said drive is varied to cause said drive to operate the impeller at its maximum speed.

5. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, and manual means operatively connected to the valve and operable only at full throttle of the engine for controlling said valve.

6. In combination with an internal combustion engine, a supercharger connected to the intake thereof and having an impeller, a flexible and infinitely variable speed drive, within limits, between said engine and the impeller of the supercharger, said engine having a throttle, a fluid brake for controlling the speed of said drive, a fluid pressure supply pipe leading to said brake, a valve in said pipe for controlling the retarding action of said brake on said drive to vary the speed of said impeller, and operative connections between the throttle and said valve, whereby the position of the throttle regulates the valve.

7. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, said engine having a throttle, means for controlling the valve, and a connection between the throttle and said last-named means, said connection being so arranged that said last-named means is only operable during a predetermined position of the engine throttle.

8. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, manual means for controlling said valve, and means independent of said manual means and responsive to changes in atmospheric pressure resulting from variations in the altitude of the engine for varying the fluid pressure in said brake to compensate for the effect of such altitude variations on the engine intake pressure.

9. In combination with an internal combustion engine, a supercharger connected to the intake thereof and having an impeller, a flexible and infinitely variable speed drive, within limits, between said engine and the impeller of the supercharger, a fluid brake for controlling the speed of said drive, a fluid pressure supply pipe leading to said brake, a valve in said pipe for controlling the retarding action of said brake on said drive to vary the speed of said impeller, manual means for controlling said valve, and means operatively connected to said valve and responsive to the intake manifold pressure of the engine for varying the degree of control of the valve by the manual means.

10. In combination with an internal combustion engine, a supercharger connected to the intake thereof and having an impeller, a flexible and infinitely variable speed drive, within limits, between said engine and the impeller of the supercharger, a fluid brake for varying the speed of said drive, and means responsive to the intake manifold pressure of the engine for regulating the fluid in said brake to vary the speed of operation of said impeller by said drive.

11. In combination with an internal combustion engine, a supercharger connected to the intake thereof and having an impeller, a flexible and infinitely variable speed drive, within limits, between said engine and the impeller of the supercharger, a fluid brake for varying the speed of said drive, a fluid pressure supply pipe leading to the brake, a valve therein, manual means for controlling the valve, means responsive to the intake manifold pressure of the engine for regulating the valve independently of the manual means, anid means responsive to changes in atmospheric pressure resulting from variations in the altitude of the engine for additionally controlling the fluid in the brake.

12. In combination with an internal combustion engine, a supercharger connected to the intake thereof and having an impeller, a flexible and infinitely variable speed drive, within limits, between said engine and the impeller of the supercharger, a fluid brake for varying the speed of said drive, a fluid pressure supply pipe leading to the brake, a valve therein, manual control means connected to the valve for regulating the pressure in the brake to cause said drive to vary the speed of said impeller, means responsive to variations in intake manifold pressure of the engine for adjusting said valve independently of said manual means, and means responsive to changes in atmospheric pressure resulting from variations in the altitude of the engine for varying the regulation of said valve by said manual means.

13. In combination with an internal combustion engine, a supercharger connected to the intake thereof and having an impeller, a flexible and infinitely variable speed drive, within limits, between said engine and the impeller of the supercharger, a fluid brake for varying the speed of said drive, a fluid pressure supply pipe leading to the brake, a valve therein, means normally holding said valve, means responsive to variations in the intake manifold pressure of the engine, operative connections between said responsive means and said valve, and means for releasing said valve holding means to permit operation thereof by said responsive means, whereby the latter adjusts the valve to cause said drive to vary the speed of the impeller.

14. In combination with an internal combustion engine, a supercharger connected to the intake thereof and having an impeller, a flexible and infinitely variable speed drive, within limits, between said engine and the impeller of the supercharger, a fluid brake for varying the speed of said drive, a fluid pressure supply pipe leading to the brake, a valve therein, said engine having a throttle, operative connections between said throttle and valve during predetermined throttle positions for varying the speed of said impeller drive, a second valve in said pipe between the first valve and said brake, means responsive to pressure resulting from variations in the altitude of the engine, and operative connections between said responsive means and said second valve for varying the control of said brake by said first valve in accordance with altitude changes.

15. In combination with an internal combustion engine, a supercharger connected to the intake thereof and having an impeller, a flexible and infinitely variable speed drive, within limits, between said engine and the impeller of the supercharger, a fluid brake for varying the speed of said drive, a fluid pressure supply pipe leading to the brake, a valve therein, said engine having a throttle, operative connections between said throttle and valve during predetermined throttle positions for varying the speed of said impeller drive, a second valve in said pipe between the first valve and said brake, means responsive to variations in the intake manifold pressure of the engine, and operative connections between said responsive means and said second valve for varying the control of said brake.

16. In combination with an internal combustion engine, a supercharger connected to the intake thereof and having an impeller, a flexible and infinitely variable speed drive, within limits, between said engine and the impeller of the supercharger, a retarding means connected to said drive, and means independent of the engine speed and responsive to the change in atmospheric pressure resulting from variations in altitude of the engine for adjusting said retarding means during operation of said supercharger to cause said drive to vary the speed of said impeller.

ALFRED T. GREGORY.